United States Patent
Soskind

(10) Patent No.: US 11,422,292 B1
(45) Date of Patent: Aug. 23, 2022

(54) SUPER-BLAZED DIFFRACTIVE OPTICAL ELEMENTS WITH SUB-WAVELENGTH STRUCTURES

(71) Applicant: Apple Inc., Cupertino, CA (US)

(72) Inventor: Yakov G. Soskind, Plainsboro, NJ (US)

(73) Assignee: APPLE INC., Cupertino, CA (US)

( * ) Notice: Subject to any disclaimer, the term of this patent is extended or adjusted under 35 U.S.C. 154(b) by 463 days.

(21) Appl. No.: 16/428,999

(22) Filed: Jun. 2, 2019

Related U.S. Application Data

(60) Provisional application No. 62/682,944, filed on Jun. 10, 2018.

(51) Int. Cl.
*G02B 5/18* (2006.01)

(52) U.S. Cl.
CPC .......... *G02B 5/1823* (2013.01); *G02B 5/1847* (2013.01)

(58) Field of Classification Search
CPC .............. G02B 5/18; G02B 5/1809; G02B 2005/1804; G02B 27/4205–44
See application file for complete search history.

(56) References Cited

U.S. PATENT DOCUMENTS

| | | |
|---|---|---|
| 3,796,498 A | 3/1974 | Post |
| 4,386,827 A | 6/1983 | Scifres et al. |
| 4,850,673 A | 7/1989 | Velzel et al. |
| 4,983,825 A * | 1/1991 | Ichikawa ............ G02B 27/4277 359/569 |
| 5,067,816 A * | 11/1991 | Ichikawa ............ G02B 27/4277 250/237 G |
| 5,225,928 A | 7/1993 | Dugan |
| 5,406,543 A | 4/1995 | Kobayashi et al. |
| 5,428,445 A * | 6/1995 | Holzapfel ............... G21K 1/06 |
| 5,477,383 A | 12/1995 | Jain |
| 5,606,181 A | 2/1997 | Sakuma et al. |
| 5,621,497 A * | 4/1997 | Terasawa ............... G03F 7/2022 355/53 |
| 5,648,951 A | 7/1997 | Kato et al. |
| 5,652,426 A * | 7/1997 | Maeda ..................... G01D 5/38 250/237 G |
| 5,691,989 A | 11/1997 | Rakuljic et al. |
| 5,703,675 A * | 12/1997 | Hirukawa ........... G03F 7/70108 355/53 |

(Continued)

FOREIGN PATENT DOCUMENTS

| | | |
|---|---|---|
| CN | 1725042 A | 1/2006 |
| EP | 0670510 A2 | 9/1995 |

(Continued)

OTHER PUBLICATIONS

"Talbot Effect", retrieved Jan. 2022, wikipedia.org (Year: 2022).*

(Continued)

*Primary Examiner* — Christopher Stanford
(74) *Attorney, Agent, or Firm* — Kligler & Associates Patent Attorneys Ltd

(57) ABSTRACT

An optical element includes first and second transmission gratings positioned in mutual proximity and in a mutually-parallel orientation and having respective first and second phase modulation profiles with a common period and different, respective first and second numbers of modulation peaks and troughs in each period.

16 Claims, 3 Drawing Sheets

(56) References Cited

U.S. PATENT DOCUMENTS

| | | | |
|---|---|---|---|
| 5,742,262 A | 4/1998 | Tabata et al. | |
| 5,781,332 A | 7/1998 | Ogata | |
| 5,801,378 A * | 9/1998 | Hane | G03F 7/70283 355/71 |
| 5,812,320 A * | 9/1998 | Maeda | G01D 5/38 250/237 G |
| 6,002,520 A | 12/1999 | Hoch et al. | |
| 6,031,611 A | 2/2000 | Rosakis et al. | |
| 6,236,773 B1 | 5/2001 | Butler et al. | |
| 6,415,083 B1 | 7/2002 | Anderson et al. | |
| 6,560,019 B2 | 5/2003 | Nakai | |
| 6,583,873 B1 | 6/2003 | Goncharov et al. | |
| 6,611,000 B2 | 8/2003 | Tamura et al. | |
| 6,707,027 B2 | 3/2004 | Liess et al. | |
| 6,927,852 B2 | 8/2005 | Reel | |
| 6,940,583 B2 | 9/2005 | Butt et al. | |
| 7,112,774 B2 | 9/2006 | Baer | |
| 7,112,813 B2 * | 9/2006 | Den Boef | G03F 9/7046 250/548 |
| 7,123,794 B2 | 10/2006 | Greiner et al. | |
| 7,227,618 B1 | 6/2007 | Bi | |
| 7,304,735 B2 | 12/2007 | Wang et al. | |
| 7,335,898 B2 | 2/2008 | Donders et al. | |
| 7,433,444 B2 * | 10/2008 | Baumann | A61B 6/032 378/145 |
| 7,470,892 B2 * | 12/2008 | Ohmura | G03F 9/7076 250/548 |
| 7,492,871 B2 * | 2/2009 | Popescu | A61B 6/00 378/145 |
| 7,522,698 B2 * | 4/2009 | Popescu | A61B 6/4291 378/19 |
| 7,564,941 B2 * | 7/2009 | Baumann | A61B 6/484 378/146 |
| 7,700,904 B2 | 4/2010 | Toyoda et al. | |
| 7,952,781 B2 | 5/2011 | Weiss et al. | |
| 8,530,811 B2 * | 9/2013 | Molnar | G03F 7/70333 355/53 |
| 8,749,796 B2 | 6/2014 | Pesach et al. | |
| 8,908,277 B2 | 12/2014 | Pesach et al. | |
| 9,036,158 B2 | 5/2015 | Pesach | |
| 9,066,087 B2 | 6/2015 | Shpunt | |
| 9,098,931 B2 | 8/2015 | Shpunt et al. | |
| 9,105,369 B2 * | 8/2015 | Koehler | G21K 1/067 |
| 9,131,136 B2 | 9/2015 | Shpunt et al. | |
| 9,201,237 B2 | 12/2015 | Chayat et al. | |
| 9,222,899 B2 * | 12/2015 | Yamaguchi | G02B 5/1842 |
| 9,395,176 B2 * | 7/2016 | Saendig | G01D 5/38 |
| 9,689,968 B2 | 6/2017 | Zou et al. | |
| 9,696,605 B2 | 7/2017 | Russo et al. | |
| 9,874,531 B2 * | 1/2018 | Yun | G03F 7/70458 359/558 |
| 9,881,710 B2 * | 1/2018 | Roessl | G02B 27/52 |
| 10,634,973 B2 | 4/2020 | Hashemi et al. | |
| 10,802,120 B1 | 10/2020 | LaChapelle et al. | |
| 2004/0012958 A1 | 1/2004 | Hashimoto et al. | |
| 2004/0082112 A1 | 4/2004 | Stephens | |
| 2004/0184694 A1 | 9/2004 | Ridgway et al. | |
| 2005/0178950 A1 | 8/2005 | Yoshida | |
| 2006/0001055 A1 | 1/2006 | Ueno et al. | |
| 2006/0252167 A1 | 11/2006 | Wang | |
| 2006/0252169 A1 | 11/2006 | Ashida | |
| 2006/0269896 A1 | 11/2006 | Liu et al. | |
| 2007/0007676 A1 | 1/2007 | Sato | |
| 2007/0019909 A1 | 1/2007 | Yamauchi et al. | |
| 2007/0183560 A1 * | 8/2007 | Popescu | G01N 23/041 378/5 |
| 2008/0106746 A1 | 5/2008 | Shpunt et al. | |
| 2008/0198355 A1 | 8/2008 | Domenicali et al. | |
| 2008/0212835 A1 | 9/2008 | Tavor | |
| 2008/0240502 A1 | 10/2008 | Freedman et al. | |
| 2008/0278572 A1 | 11/2008 | Gharib et al. | |
| 2009/0011368 A1 * | 1/2009 | Ichihara | G03F 7/7035 430/319 |
| 2009/0090937 A1 | 4/2009 | Park | |
| 2009/0096783 A1 | 4/2009 | Shpunt et al. | |
| 2009/0183125 A1 | 7/2009 | Magal et al. | |
| 2009/0185274 A1 | 7/2009 | Shpunt | |
| 2010/0007717 A1 | 1/2010 | Spektor et al. | |
| 2010/0008588 A1 | 1/2010 | Feldkhun et al. | |
| 2010/0013860 A1 | 1/2010 | Mandella et al. | |
| 2010/0142014 A1 | 6/2010 | Rosen et al. | |
| 2010/0278479 A1 | 11/2010 | Bratkovski et al. | |
| 2010/0284082 A1 | 11/2010 | Shpunt et al. | |
| 2011/0019258 A1 | 1/2011 | Levola | |
| 2011/0069389 A1 | 3/2011 | Shpunt | |
| 2011/0075259 A1 | 3/2011 | Shpunt | |
| 2011/0114857 A1 | 5/2011 | Akerman et al. | |
| 2011/0187878 A1 | 8/2011 | Mor et al. | |
| 2011/0188054 A1 | 8/2011 | Petronius et al. | |
| 2011/0295331 A1 | 12/2011 | Wells et al. | |
| 2016/0161427 A1 * | 6/2016 | Butler | G21K 1/067 |
| 2019/0324202 A1 | 10/2019 | Colburn et al. | |
| 2019/0391271 A1 | 12/2019 | Goodwill | |
| 2020/0033190 A1 | 1/2020 | Popovich et al. | |
| 2020/0290622 A1 | 9/2020 | Fattal | |

FOREIGN PATENT DOCUMENTS

| | | |
|---|---|---|
| JP | 2011118178 A | 6/2011 |
| KR | 102070349 B1 | 1/2020 |
| WO | 2007/043036 A1 | 4/2007 |
| WO | 2007/105205 A2 | 9/2007 |
| WO | 2008/120217 A2 | 10/2008 |
| WO | 2010/004542 A1 | 1/2010 |
| WO | 2012020380 A1 | 2/2012 |
| WO | 2019195174 A1 | 10/2019 |
| WO | 2020002164 A1 | 1/2020 |
| WO | 2020072034 A1 | 4/2020 |

OTHER PUBLICATIONS

Fienup, J.R., "Phase Retrieval Algorithms: A Comparison", Applied Optics, vol. 21, No. 15, pp. 2758-2769, Aug. 1, 1982.

Garcia et al., "Projection of Speckle Patterns for 3D Sensing", Journal of Physics, Conference series 139, pp. 1-7, year 2008.

Garcia et al., "Three-dimensional mapping and range measurement by means of projected speckle patterns", Applied Optics, vol. 47, No. 16, pp. 3032-3040, Jun. 1, 2008.

Gerchberg et al., "A Practical Algorithm for the Determination of the Phase from Image and Diffraction Plane Pictures," Journal Optik, vol. 35, No. 2, pp. 237-246, year 1972.

Sazbon et al., "Qualitative Real-Time Range Extraction for Preplanned Scene Partitioning Using Laser Beam Coding," Pattern Recognition Letters 26, pp. 1772-1781, year 2005.

Moharam et al. "Rigorous coupled-wave analysis of planar-grating diffraction", Journal of the Optical Society of America, vol. 71, No. 6, pp. 811-818, Jul. 1981.

Microvision Inc., "Micro-Electro-Mechanical System (MEMS) Scanning Mirror", p. 1, years 1996-2009.

Eisen et al., "Total internal reflection diffraction grating in conical mounting",Optical Communications 261, pp. 13-18, year 2006.

O'Shea et al., "Diffractive Optics: Design, Fabrication and Test", SPIE Tutorial Texts in Optical Engineering, vol. TT62, pp. 66-72, SPIE Press, USA 2004.

Btendo, "Two Uni-axial Scanning Mirrors Vs One Bi-axial Scanning Mirror", Kfar Saba, Israel, pp. 1-4, Aug. 13, 2008.

Marcia et al., "Fast Disambiguation of Superimposed Images for Increased Field of View", IEEE International Conference on Image Processing, San Diego, USA, pp. 1-4, Oct. 12-15, 2008.

Bradley et al., "Synchronization and Rolling Shutter Compensation for Consumer Video Camera Arrays", IEEE International Workshop on Projector-Camera Systems—PROCAMS 2009, Miami Beach, Florida, pp. 1-8, year 2009.

Ezconn Czech A.S. "Site Presentation", pp. 1-32, Oct. 2009.

Luxtera Inc., "Luxtera Announces World's First 10GBit CMOS Photonics Platform", Carlsbad, USA, pp. 1-2, Mar. 28. 2005 (press release).

Soskind, "Field Guide to Diffractive Optics," SPIE Press, Bellingham, USA, pp. 51-55, year 2011.

(56) References Cited

OTHER PUBLICATIONS

Soskind., "Field Guide to Diffractive Optics", SPIE Press, Bellingham, USA, pp. 56-59, Aug. 18, 2011.
Niu et al., "Development Status of Optical Phased Array Beam Steering Technology," Proceedings of SPIE, vol. 11052, pp. 110521P-1-110521P-7, year 2019.
Rudnick et al., "Sub-GHz Resolution Photonic Spectral Processor and Its System Applications," IEEE Journal of Lightwave Technology, vol. 35, No. 11, pp. 2218-2226, Jun. 2017.
International Application # PCT/US2021/062996 Search Report dated Mar. 25, 2022.

* cited by examiner

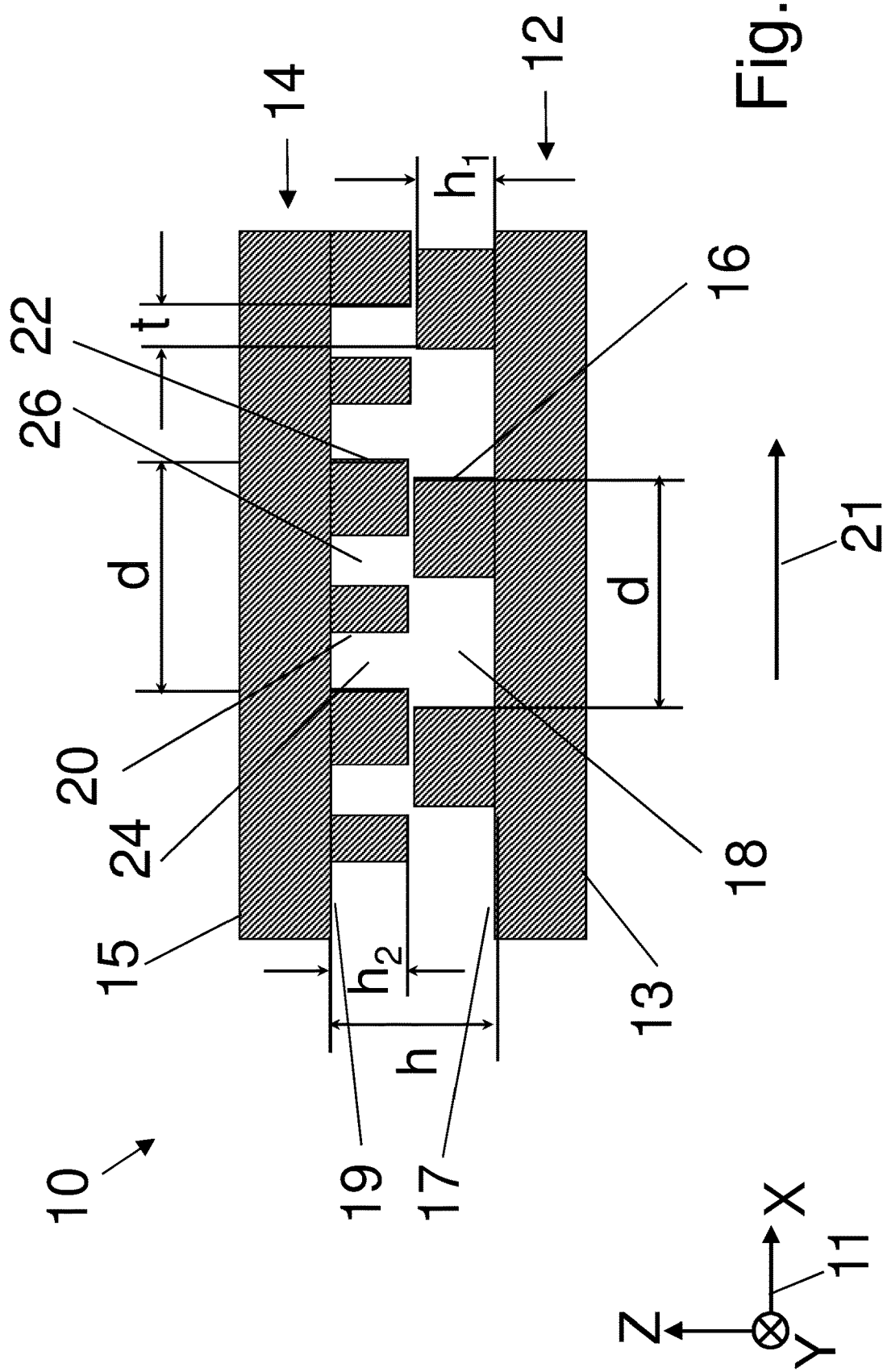

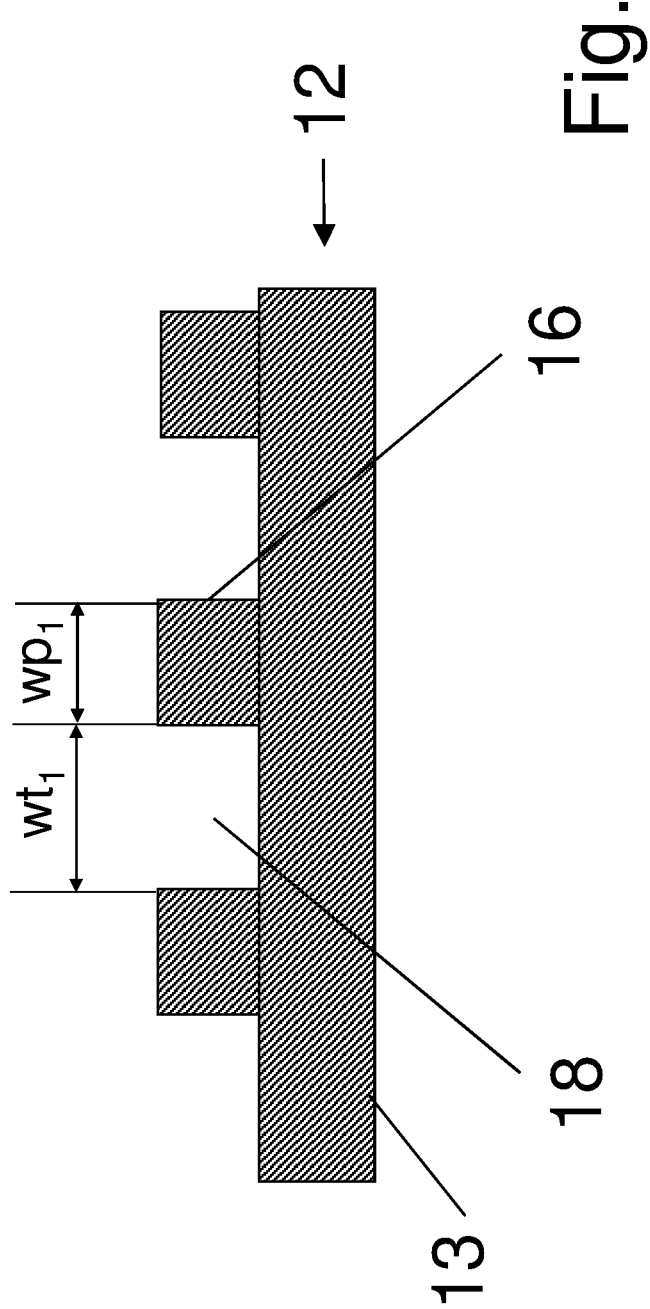

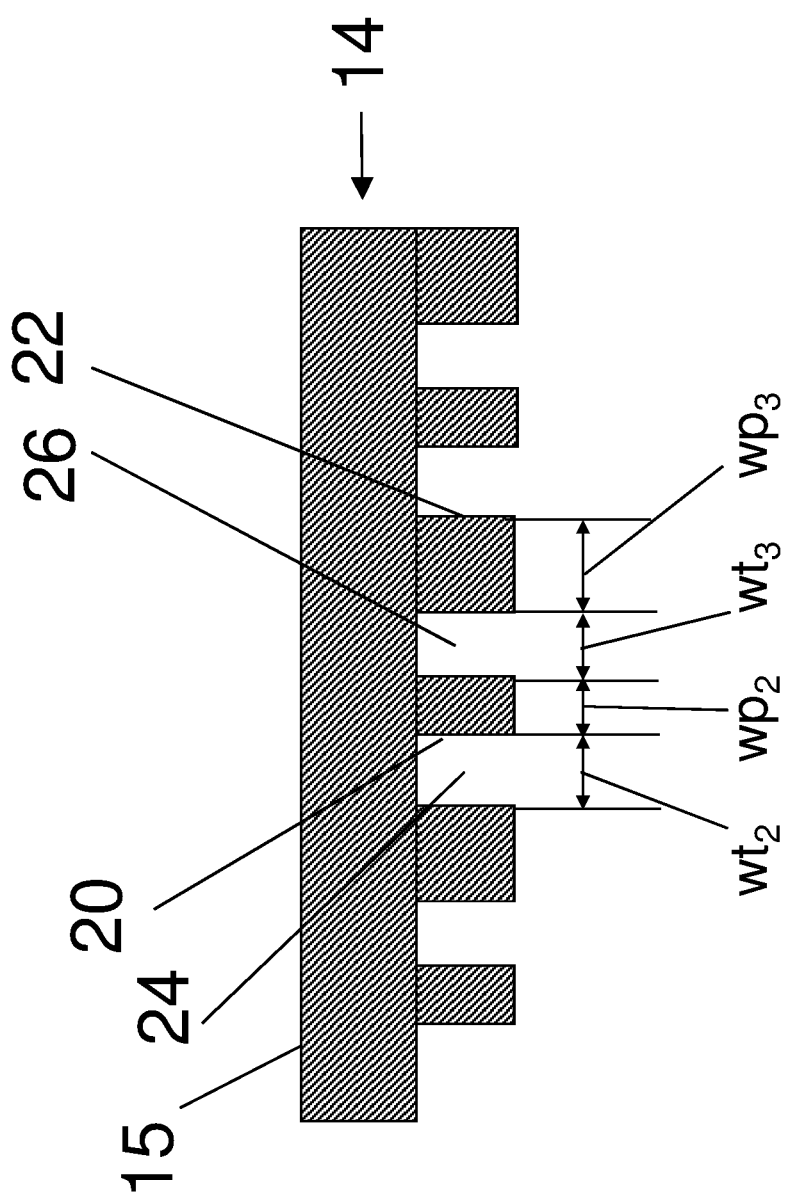

SUPER-BLAZED DIFFRACTIVE OPTICAL ELEMENTS WITH SUB-WAVELENGTH STRUCTURES

CROSS-REFERENCE TO RELATED APPLICATION

This application claims the benefit of U.S. Provisional Patent Application 62/682,944, filed Jun. 10, 2018.

FIELD OF THE INVENTION

The present invention relates generally to optical elements, and particularly to diffractive optical elements.

BACKGROUND

Diffractive optical elements (DOEs) are a group of optical elements that use diffractive structures, such as gratings, to modulate the local phase of incident light. Such elements can be designed to operate in a reflective mode or in a transmissive mode. DOEs possess unique optical properties that often cannot be attained with optical elements operating on refractive or reflective principles.

Surface-relief DOEs, comprising surface-relief micro-structures, are an important subset of DOEs. The spatial dimensions of these micro-structures vary from a fraction of the operating wavelength to several hundred wavelengths. The period of the phase modulation profile of a DOE, measured in a direction parallel to the surface of the DOE, controls the angles of diffraction between the incident light and the diffracted orders. The profile of the micro-structure, defined by the height and shape characteristics of the peaks and troughs in the micro-structure, controls the diffraction efficiencies into the various orders. For example, for a DOE with a period significantly larger than the operating wavelength, most of the propagating light can be directed at a very high diffraction efficiency into a single diffraction order when the profile of the micro-structure satisfies the so-called blazing condition (see Y. Soskind, *Field Guide to Diffractive Optics*, pp. 56-59, SPIE Press, Bellingham, Wash., 2011).

SUMMARY

Embodiments of the present invention that are described hereinbelow provide improved DOEs and methods for their manufacture and use.

There is therefore provided, in accordance with an embodiment of the invention, an optical element, including first and second transmission gratings positioned in mutual proximity and in a mutually-parallel orientation and having respective first and second phase modulation profiles with a common period and different, respective first and second numbers of modulation peaks and troughs in each period.

In a disclosed embodiment, a distance between neighboring modulation peaks of the first and second transmission gratings in a direction perpendicular to a common plane of the gratings does not exceed 0.5 μm. Additionally or alternatively, the modulation peaks of the first and second transmission gratings are offset in a direction perpendicular to the common plane by a distance selected so as to maximize a diffraction efficiency of the optical element into a given diffraction order at a given wavelength and polarization of light.

In one embodiment, the first number is one and the second number is two. In an alternative embodiment, the first number exceeds one and the second number exceeds the first number.

In some embodiments, the first and second transmission gratings include surface-relief micro-structures, which define the first and second phase modulation profiles. Typically, the first and second transmission gratings include respective first and second substrates having respective surfaces on which the surface-relief micro-structures are formed, and the first and second substrates are arranged so that the respective surfaces on which the surface-relief micro-structures are formed are mutually-adjacent. In a disclosed embodiment, the first and second substrates are arranged so that the modulation peaks in the surface-relief micro-structures of the first and second transmission gratings are separated by a distance no greater than 500 nm.

There is also provided, in accordance with an embodiment of the invention, a method for producing an optical element, which includes providing first and second transmission gratings having respective first and second phase modulation profiles with a common period and different, respective first and second numbers of modulation peaks and troughs in each period. The first and second transmission gratings are positioned in mutual proximity and in a mutually-parallel orientation.

The present invention will be more fully understood from the following detailed description of the embodiments thereof, taken together with the drawings in which:

BRIEF DESCRIPTION OF THE DRAWINGS

FIG. 1 is a schematic cross-section of a composite DOE, in accordance with an embodiment of the invention; and FIGS. 2 and 3 are schematic sectional views of DOEs incorporated in a composite DOE, in accordance with an embodiment of the invention.

DETAILED DESCRIPTION OF EMBODIMENTS

The diffraction efficiencies of surface-relief DOEs can be controlled by the appropriate design of the profile of the micro-structure of the surface relief. For example, a blazed transmissive DOE with a period of 20 μm and a saw-tooth shaped profile with a height of 2.08 μm, operating at a wavelength of 0.94 μm, exhibits very high diffraction efficiencies to the first (+1) diffraction order at 2.69°: The DOE will diffract 92.7% of incident TE-polarized light and 92.2% of incident TM-polarized light into the +1 order, with concomitant low diffraction efficiencies to other orders. (The terms "optical radiation" and "light" as used in the present description and in the claims refer generally to any and all of visible, infrared, and ultraviolet radiation.) The diffraction efficiency of a DOE into a given diffraction order is defined as the ratio between the optical power diffracted into that order and the optical power of the light impinging on the DOE.

On the other hand, reducing the period to 2.0 μm to increase the +1 order diffraction angle to 28.0° requires a blazed profile height of 1.62 μm, and will result in +1 order diffraction efficiencies of only 49.1% for TE-polarized light and 48.4% for TM-polarized light. By increasing the blazed profile height, higher diffraction efficiencies can be achieved, but at the cost of increasing fabrication difficulties.

In some designs, each period of the surface relief can be further divided into sub-wavelength structures, with the advantage that higher diffraction efficiencies that can be achieved at relatively shallow profile heights, using relatively simple binary step profiles. Although the profiles in such designs are shallower than those of blazed gratings, the division of the profile into sub-wavelength sections again leads to high aspect ratios with associated challenges for accurate fabrication.

Embodiments of the present invention that are described herein address these problems by providing an optical element, which is a composite of two DOEs comprising transmission gratings positioned in mutual proximity. The gratings have phase modulation profiles with a common period, but each grating has a different number of modulation peaks and troughs in each period.

In the embodiments described hereinbelow, the transmission gratings comprise surface-relief micro-structures, which define the first and second phase modulation profiles. Although the two DOEs of the composite DOE have low aspect ratios, thus enabling accurate fabrication, the diffraction efficiencies of the composite DOE are very high (>80%) even for high diffraction angles. Alternatively, the principles of the present invention may be applied, mutatis mutandis, to DOEs having other types of phase modulation structures.

In the disclosed embodiments, the two DOEs are produced individually, using methods that are known in the art, and are then positioned and mounted parallel to and facing each other, meaning that the substrates on which the surface-relief micro-structures are formed are arranged so that the micro-structures on the two substrates are mutually-adjacent, and their peaks and troughs mutually parallel. The modulation peaks in the surface-relief micro-structures on one DOE are typically separated from the modulation peaks on the other DOE by a fraction of the operating wavelength, for example by 500 nm or less. The lateral shift between the respective microstructures on two DOEs (meaning the offset between the modulation peaks in the two transmission gratings), as well as the separation between the DOEs, is chosen so as to maximize the diffraction efficiency of the composite DOE into a given diffraction order at a given wavelength and polarization of light.

In an embodiment of the present invention, one DOE includes one peak and one trough in each period of its phase modulation profile, whereas the other DOE includes two or more pairs of peaks and troughs in each period. In the design of the composite DOE, the duty cycles of the pairs of peaks and troughs in each DOE are determined so as to maximize the diffraction efficiency of the composite DOE for the given diffraction order, wavelength and polarization.

Additionally or alternatively, both the phase modulation profiles and the relative positions (separation and offset) of the two DOEs are designed so as to simultaneously both maximize the diffraction efficiency and minimize the reflection losses of the composite DOE.

FIG. 1 is a schematic cross-section of a composite DOE 10, in accordance with an embodiment of the invention. Composite DOE 10 includes a first DOE 12 and a second DOE 14, with respective front surfaces 17 and 19 and respective surface-relief micro-structures formed on the front surfaces. Referring to Cartesian coordinates 11, the height profile of the micro-structures on each front surface 17 and 19 is defined as the height of each point on the surface in the z-direction from, respectively, a back plane 13 of first DOE 12 and a back plane 15 of second DOE 14, wherein the back planes lie parallel to the xy-plane.

The height profile can be seen as a phase modulation profile, as it modulates the phase of the optical waves impinging on the surface. The phase modulation profile comprises successive peaks and troughs, where peaks refer to points of the front surface that are farthest from the respective back plane, and troughs refer to points of the front surface that are closest to the respective back plane. The phase modulation profiles of both front surfaces 17 and 19 are periodic in the x-direction with a common period d, but with a constant profile in the y-direction. Thus, the phase modulation profile repeats itself for each shift of one period d in the x-direction. A grating vector 21, common to the first and second DOEs 12 and 14, respectively, is defined as a vector in the x-direction (in the plane of the DOEs and perpendicular to the peaks and troughs) with a length of 1/d in units of inverse length.

One period of first DOE 12 includes a first peak 16 and a first trough 18. One period of second DOE 14 includes a second peak 20 and a third peak 22 interleaved with a second trough 24 and a third trough 26. Details of the widths of peaks 16, 20, and 22 and of troughs 18, 24, and 26, are shown in FIGS. 2-3.

In an example embodiment, the period common to first DOE 12 and second DOE 14 is d=2.0 μm; the distance between the bottoms of the troughs of the two DOEs is h=2.0 μm; and the heights of the peaks of the two DOEs are $h_1=h_2=0.95$ μm, meaning that the peaks on one DOE are separated from those on the other DOE by only 100 nm. The lateral offset between the respective micro-structures on the first DOE 12 and second DOE 14, measured from a left edge from first peak 16 to a left edge of third peak 22, is t=0.17 μm.

FIG. 2 is a schematic cross-section of first DOE 12 of FIG. 1, in accordance with an embodiment of the invention. The width of first peak 16 is $wp_1=0.675$ μm, and the width of first trough 18 is $wt_1=1.325$ μm. A first duty cycle $ds_1$ is defined as $wp_1/wt_1$; in the present embodiment $ds_1=0.509$.

FIG. 3 is a schematic cross-section of second DOE 14 of FIG. 1, in accordance with an embodiment of the invention. The width of second peak 20 is $wp_2=0.4$ μm, the width of third peak 22 is $wp_3=0.6$ μm, and the widths of second and third troughs 24 and 26, respectively, are $wt_2=0.5$ μm and $wt_3=0.5$ μm.

For the embodiment disclosed in FIGS. 1-3, the calculated diffraction efficiency of composite DOE 10 for TM-polarized light with a wavelength of 0.94 μm for the +1 order at a diffraction angle of 28.0° is 94.5%, and the calculated reflection losses are 1%. The dimensions of composite DOE 10 may be optimized for TE-polarized light at the same wavelength, leading to a calculated diffraction efficiency of 93.9% and reflection losses of 2.5%. The high diffraction efficiencies, as well as low reflection losses, of the disclosed embodiment are achieved by iteratively optimizing the duty cycles $ds_1$, $ds_2$, and $ds_3$, the heights $h_1$ and $h_2$, the separation h, and the lateral offset t, using a physical model of the interaction of the incident light with the phase modulation profile.

Due to a coherent interaction of light between first DOE 12 and second DOE 14, the diffraction efficiency of composite DOE 10 in the present embodiment is much higher than that of each of the two DOEs separately. Similarly, the reflection losses of composite DOE 10 are much lower than the reflection losses of either first DOE 12 or second DOE 14.

In alternative embodiments, the numbers of peaks and troughs in the two DOEs forming a composite DOE may be chosen from other combinations of unequal numbers, such as, for example, one peak/trough-pair in the first DOE and three peak/trough-pairs in the second DOE, or two peak/trough-pairs in the first DOE and three peak/trough-pairs in the second DOE, or any other combination of unequal numbers for the peak/trough-pairs in the two DOEs. For each combination of peak/trough-pairs, the dimensions of the two DOEs are optimized similarly to the optimization of the embodiment disclosed in FIGS. 1-3.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. An optical element, comprising:
    a first transmission grating having a first phase modulation profile comprising a first pattern of alternating peaks and troughs, which repeats itself for each shift of one predefined period in the grating direction and comprises a given number of first peaks, having a first width, in each period; and
    a second transmission grating positioned in proximity and in a parallel orientation to the first transmission grating and having a second phase modulation profile comprising a second pattern of alternating peaks and troughs, which repeats itself for each shift of the same period as the first pattern along the same grating direction and comprises the same given number of second peaks, having a second width, and also comprises third peaks, interleaved between the second peaks and having a third width different from the second width, in each period.

2. The optical element of claim 1, wherein a distance between neighboring peaks of the first and second transmission gratings in a direction perpendicular to a common plane of the gratings does not exceed 0.5 µm.

3. The optical element of claim 1, wherein the peaks of the first and second transmission gratings are offset in the grating direction by a distance selected so as to maximize a diffraction efficiency of the optical element into a given diffraction order at a given wavelength and polarization of light.

4. The optical element of claim 1, wherein the given number is one.

5. The optical element of claim 1, wherein the given number exceeds one.

6. The optical element of claim 1, wherein the first and second transmission gratings comprise surface-relief micro-structures, which define the first and second phase modulation profiles.

7. The optical element of claim 6, wherein the first and second transmission gratings comprise respective first and second substrates having respective surfaces on which the surface-relief micro-structures are formed, and wherein the first and second substrates are arranged so that the respective surfaces on which the surface-relief micro-structures are formed are mutually-adjacent.

8. The optical element of claim 7, wherein the first and second substrates are arranged so that the peaks in the surface-relief micro-structures of the first and second transmission gratings are separated by a distance no greater than 500 nm.

9. A method for producing an optical element, comprising:
    providing a first transmission grating having a first phase modulation profile comprising a first pattern of alternating peaks and troughs, which repeats itself for each shift of one predefined period in the grating direction and comprises a given number of first peaks, having a first width, in each period;
    providing a second transmission grating having a second phase modulation profile comprising a second pattern of alternating peaks and troughs, which repeats itself for each shift of the same period as the first pattern along the same grating direction and comprises the same given number of second peaks, having a second width, and also comprises third peaks, interleaved between the second peaks and having a third width different from the second width, in each period; and
    positioning the second transmission grating in proximity and in a parallel orientation to the first transmission grating.

10. The method of claim 9, wherein positioning the second transmission grating comprises mounting the first and second transmission gratings so that a distance between neighboring peaks of the first and second transmission gratings in a direction perpendicular to a common plane of the gratings does not exceed 0.5 µm.

11. The method of claim 9, wherein positioning the second transmission grating comprises mounting the first and second transmission gratings so that the peaks of the first and second transmission gratings are offset in the grating direction by a distance selected so as to maximize a diffraction efficiency of the method into a given diffraction order at a given wavelength and polarization of light.

12. The method of claim 9, wherein the given number is one.

13. The method of claim 9, wherein the given number exceeds one.

14. The method of claim 9, wherein the first and second transmission gratings comprise surface-relief micro-structures, which define the first and second phase modulation profiles.

15. The method of claim 14, wherein the first and second transmission gratings comprise respective first and second substrates having respective surfaces on which the surface-relief micro-structures are formed, and wherein positioning the first and second transmission gratings comprises mounting the first and second transmission gratings so that the respective surfaces on which the surface-relief micro-structures are formed are mutually-adjacent.

16. The method of claim 15, wherein the first and second substrates are mounted so that the peaks in the surface-relief micro-structures of the first and second transmission gratings are separated by a distance no greater than 500 nm.

* * * * *